Oct. 26, 1926.
E. L. ESTEL
1,604,398
SURVEYING INSTRUMENT
Filed April 27, 1923
3 Sheets-Sheet 2
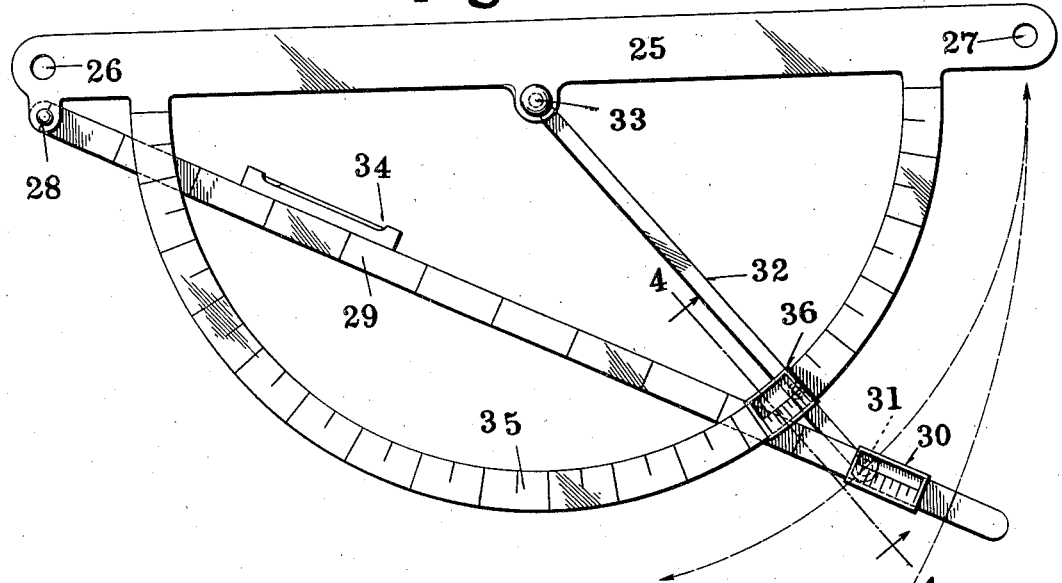
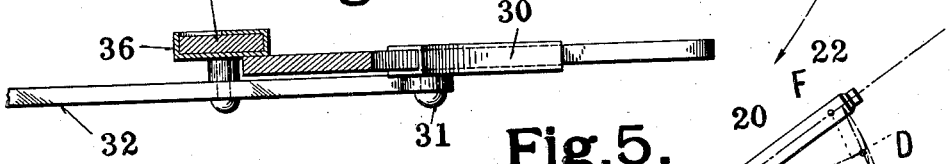
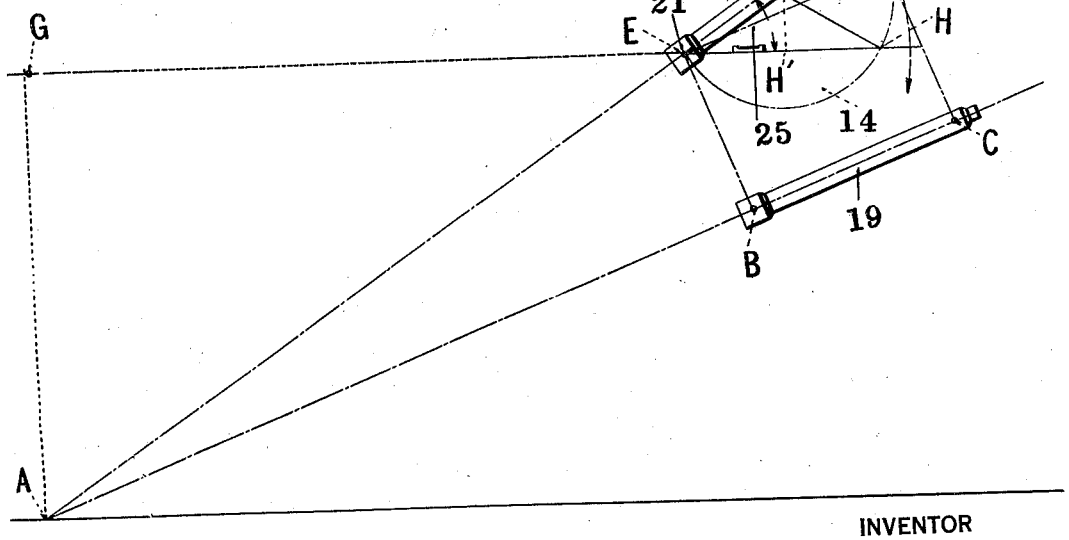
INVENTOR
EDWIN L. ESTEL
BY
E. E. Huffman
ATTORNEY Oct. 26, 1926.
E. L. ESTEL
1,604,398
SURVEYING INSTRUMENT
Filed April 27, 1923    3 Sheets-Sheet 3
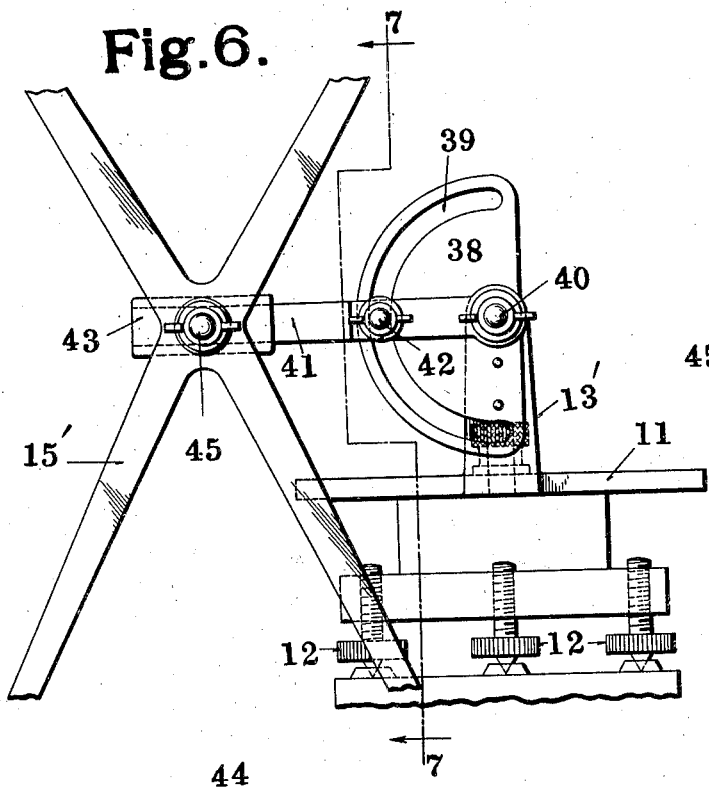
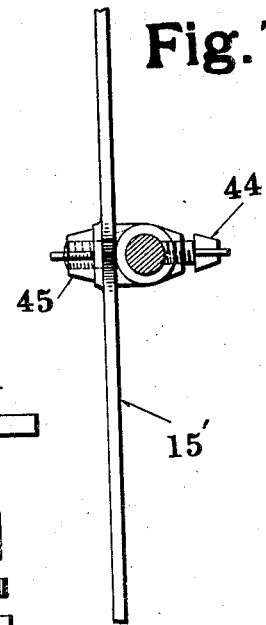
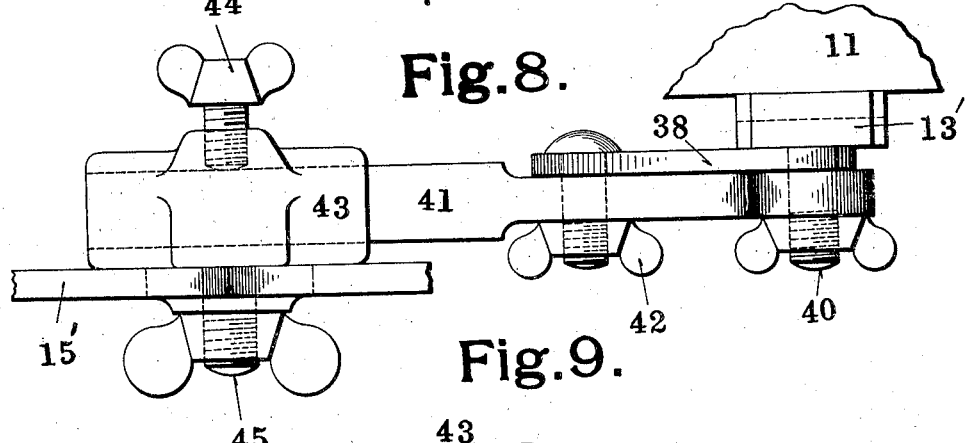
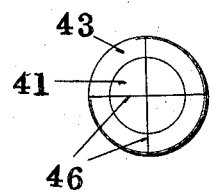
INVENTOR
EDWIN L. ESTEL
BY
ATTORNEY Patented Oct. 26, 1926.

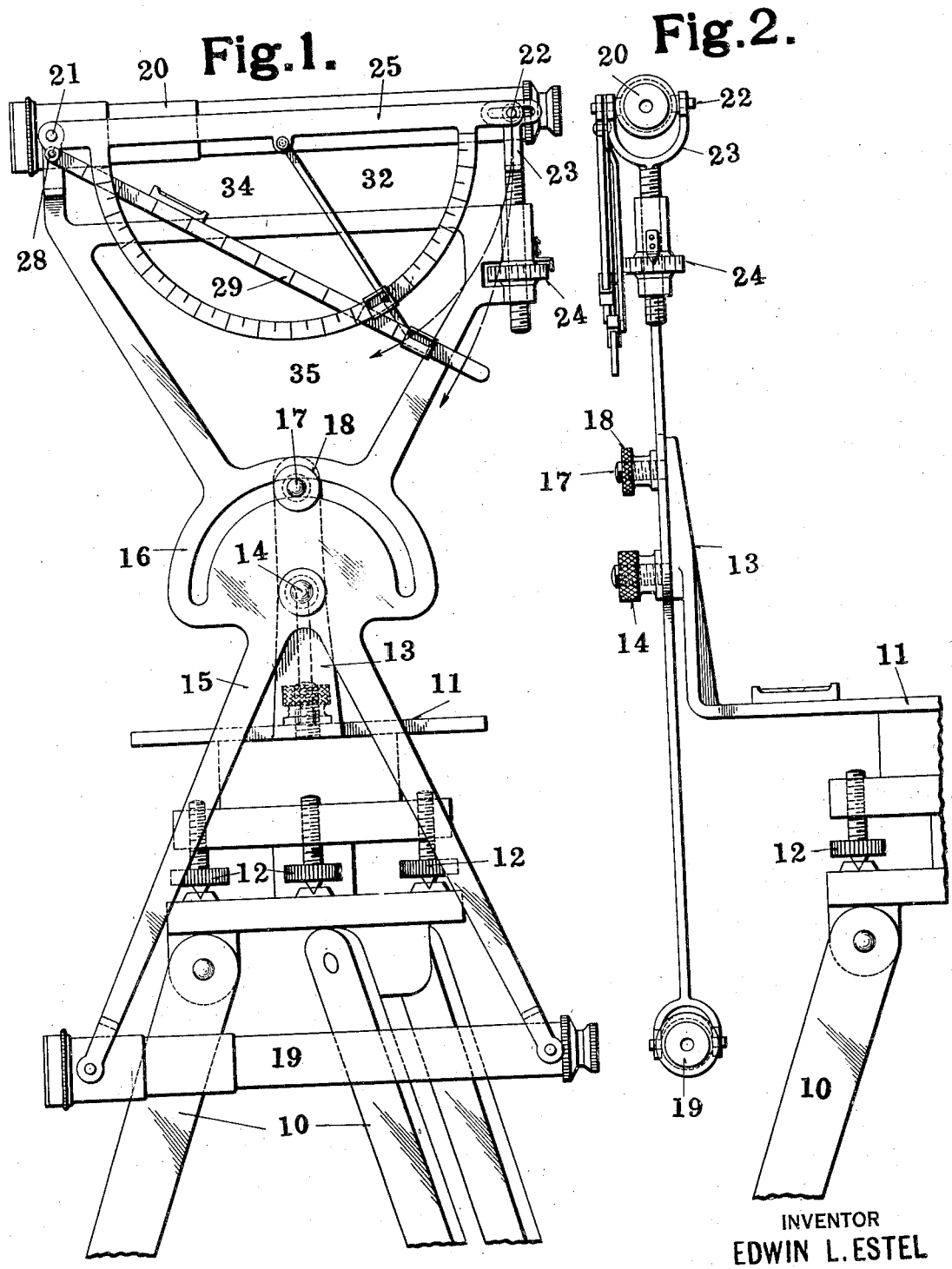

1,604,398

UNITED STATES PATENT OFFICE.

EDWIN L. ESTEL, OF ST. LOUIS, MISSOURI.

SURVEYING INSTRUMENT.

Application filed April 27, 1923. Serial No. 634,967.

My invention relates to a surveying instrument and particularly to an instrument adapted to be used as a range finder and at the same time applicable to other surveying operations. One of the principal objects of my invention is to reduce the necessary mathematical calculations to a minimum, thus adapting it to use by persons not highly skilled in the art.

In the accompanying drawings, which illustrate one form of instrument made in accordance with my invention, together with a slight modification thereof, Figure 1 is a side elevation; Figure 2 is an end view; Figure 3 is an enlarged detached view of the limb; Figure 4 is a section taken on the line 4—4 of Figure 3; Figure 5 is a diagrammatic view; Figure 6 is a side view showing a modification; Figure 7 is a section taken on the line 7—7 of Figure 6; Figure 8 is an enlarged top plan view of the auxiliary arm shown in Figures 6 and 7, and Figure 9 is an end view of the auxiliary arm.

The instrument is shown as provided with a support consisting of a tripod 10 carrying a table 11, provided with leveling screws 12, all of the usual form. It will be understood, however, that any other suitable support may be used. Extending upwardly from one edge of the table 11, is a standard 13 to which is pivoted at 14 a frame 15 carrying the telescope or other sighting devices. The frame is provided with an arcuate slot 16, through which passes a threaded stud 17 engaged by a binding nut 18 by means of which the frame 15 may be clamped in the necessary angular position after being adjusted around its pivot 14. In the drawings I have shown two telescopes 19 and 20, respectively, the former being held in fixed relation to the frame 15, and the latter adjustable with respect thereto, as will be hereinafter described. It will be understood, however, that other sighting devices may be used in place of telescopes, and that a single sighting device might be used by making it detachable so as to be placed either in the lower or upper end of the frame. The upper telescope 20 is pivoted on pin 21 at its front end and is supported at its rear end by pin 22 engaging a slotted fork 23 adapted to be raised and lowered by a micrometer screw 24. The pins 21 and 22 project at each side of the telescope as shown in Figure 2, so that the limb hereinafter to be described may be attached at either side thereof. The micrometer 24 is so arranged that when at O the axis of the telescope 20 will be parallel with the axis of the telescope 19.

The first operation in finding the distance of an object A (Fig. 5) is as follows; The frame 15 is swung on its pivot 14 until the object A is covered by the cross hair of the telescope 19, the frame being locked in this position by the clamping nut 18. The rear end of the telescope 20 is now raised by the micrometer 24 until the cross hair of the telescope 20 also covers the object A. As the line A—C and E—D are parallel the angle BAE and DEF are equal, and as the angle ABE and EDF are both right angles the triangle BAE and EFD are similar, and as the distance BE and ED are fixed and the distance FD can be read from the micrometer 24, the distance AE can be calculated by proportion, or by properly graduating the micrometer the distance may be read directly in yards, meters or other units of measurement. The required distance is, however, the horizontal distance EG, G being an imaginary point directly over the point A. In order to find the distance EG I make use of a limb which will now be described.

The limb consists of a bar 25 having holes 26 and 27 for the reception of the pins 21 and 22. Pivoted to the bar 25 at 28 is a graduated bar 29 engaging with a slide 30, preferably provided with a vernier to aid in reading the graduation on the bar, and pivoted at 31 to an arm 32. The arm 32 is pivoted to the bar 25 at a point midway between the holes 26 and 27 and on a line passing through the pivot 28 parallel with the center of said holes. It will be understood that the distance between the pivots 31 and 33 is the same as that between the pivots 28 and 33. Mounted on the upper edge of the bar 29 is a level 34 by means of which the bar may be brought to a horizontal position. In order that angles may be measured by the instrument for ordinary surveying work I prefer to provide the device with a semicircular graduated limb 35 engaged by a slide 36 carried on the arm 32 and like the slide 30 preferably provided with a vernier.

The distance AE having been found as previously described, the bar 29 is brought to a horizontal position by means of the level 34. The distance 28—31 can be read on the bar 29 by the slider 30, and one-half the distance EH will be to the required distance EG as one-half the distance 21—22 is to the distance AE previously found, therefore the required distance may be found by simple proportion.

Referring now to Figures 6 to 9 inclusive, I have shown a modification in which the standard 13 is replaced by a standard 13' having rigidly secured to it a plate 38 provided with a semicircular slot 39. Pivoted to this standard at 40 by a wing nut is an arm 41, which may be clamped in position from vertical to horizontal by a bolt 42 passing through the slot 39. The end of the arm 41 is cylindrical in form and has rotatably mounted on it a sleeve 43 adapted to be clamped in position by a locking screw 44 bound by the sleeve 43 in a frame 15' similar to the frame 15 previously described and like it provided with a pair of telescopes or other sighting device (not shown). In the drawings I have shown the frame 15' pivotally mounted on the sleeve 43 by a locking bolt 45. Usually, however, this will not be necessary and may be omitted if desired. It will be evident that with this construction the telescope may be brought into a horizontal, or any intermediate position, for various surveying operations. On Figure 9 I have shown the end of the arm 41 and sleeve 43 provided with a pair of lines 46 at right angle to each other so that the frame 15' may be readily brought into a position parallel to and at right angle to the plate 38.

Having fully described my invention, what I claim as new and desire to secure by Letters Patent of the United States is:

1. In a device of the class described, the combination with a base, of a frame pivotally mounted thereon, a pair of relatively movable sighting devices carried by said frame, and a limb cooperating with one of said sighting devices, said limb including a detachable bar, a second bar pivoted to said first named bar, and an arm also pivoted to said first named bar and having sliding connection with said second named bar.

2. A limb for surveying instruments comprising a sighting device, a bar adapted to be brought into parallel relation with the line of sight of said sighting device, a graduated bar pivoted to said first named bar, and an arm pivotally carried by said first named bar and having sliding connection with said graduated bar, the parts of said limb forming an isosceles triangle in all positions.

3. In a device of the class described, the combination with a base, of a frame pivotally carried thereby, a pair of telescopes mounted on said frame, one in pivotal and the other in fixed relation thereto, a micrometer for adjusting the pivotal telescope and a limb cooperating with the pivotal telescope, said limb including a bar adapted to be aligned with the telescope, a graduated bar pivoted to said first named bar, and an arm pivoted to said first named bar and having sliding connection with said graduated bar.

4. In a device of the class described, the combination with a frame pivoted to swing in a vertical plane, of a sighting device carried on the lower end of said frame, a second sighting device carried on the upper end of said frame, one of said sighting devices being pivoted on the frame to swing in a vertical plane, a leveling device for said pivoted sighting device including a graduated pivoted bar carrying a level, and a second pivoted bar carrying an indicating slide cooperating with said first named bar.

5. In a device of the class described, the combination with a frame pivoted to swing in a vertical plane, of a sighting device carried on the lower end of said frame, a second sighting device carried on the upper end of said frame, one of said sighting devices being pivoted on the frame to swing in a vertical plane, a leveling device for said pivoted sighting device including a graduated pivoted bar carrying a level, a second pivoted bar carrying an indicating slide cooperating with said first named bar, a graduated limb, and an indicator for said limb connected to said second named bar.

6. In a device of the class described, the combination with a frame pivoted to swing in a vertical plane, of a sighting device carried on the lower end of said frame, a second sighting device pivotally carried on the upper end of said frame, a micrometer screw for moving said top sighting device relative to the frame, a graduated limb carried by said top sighting device, a pivotal graduated arm provided with a level, a second arm connected to an indicating slide on said first named arm, and an indicator for said limb carried by said second named arm.

In testimony whereof, I have hereunto set my hand.

EDWIN L. ESTEL.